Dec. 6, 1960  E. M. NOEL  2,962,984
PRODUCT TURN-OVER AND TRANSFER MEANS FOR CONTINUOUS GRIDDLES
Filed Sept. 26, 1958

INVENTOR:
EUGENE M. NOEL
BY
ATT'YS

United States Patent Office 2,962,984
Patented Dec. 6, 1960

2,962,984

PRODUCT TURN-OVER AND TRANSFER MEANS FOR CONTINUOUS GRIDDLES

Eugene M. Noel, 42 Kingston Road, Newton Highlands, Mass.

Filed Sept. 26, 1958, Ser. No. 763,574

7 Claims. (Cl. 107—57)

This invention relates to means for turning over and transferring bakery products that are cooked first on one side and then the other on a continuous-conveyor type of processing machine.

In the mass production of bakery goods, it is conventional to provide conveyor mechanisms mounting dough receptacles which, upon receiving the dough batches are moved through ovens for converting the dough to edible condition. A special type of such equipment is required for the cooking of English muffins and the like and, since this type of bakery goods has to be grilled successively on opposite sides, it is necessary to provide equipment involving two sets of conveyors if manual turn over of the partly cooked muffins is to be avoided. One conveyor has to be equipped for receiving the dough batches and grilling them on one side. Another conveyor has to receive the half-cooked articles in inverted position and then complete the cooking or grilling operation.

The problem presented by the use of such dual conveyors is the effective turning over and transferring of half-cooked articles from one conveyor to the other conveyor and to do so without any distortion or jarring of the raised and half-cooked articles as might cause them to lose the entrapped expanding gas.

The main objects of this invention, therefore, are to provide improved means for association with a dual system of conveyors for effectively transferring English muffins, or the like, from the griddles of one conveyor to the griddles of the other conveyor; to provide such improved means for retaining the griddle contents in position from a point about midway of their inversion movement to the point of transfer to the griddles on the other conveyor; to provide improved means for assuring the unfailing and uniformly-timed transfer of the contents from the griddles of the one conveyor to the griddles of the other conveyor; to provide improved means for effecting the successive preliminary loosening of the contents of the first griddles from the surfaces thereof during the period of inversion; to provide an improved formation of the griddles on the second conveyor to insure the proper positioning of the articles transferred thereto from the first conveyor; and to provide an improved coordinated arrangement of the product inverting means and automatic product loosening means which is simple in construction and readily adapted for use on certain existing continuous griddle machines.

A specific embodiment of this invention is shown in the accompanying drawing in which.

The essential concept of this invention involves a pair of conveyors, one superposed above the other and each mounting griddles, one run of each conveyor being disposed to move in the same direction in vertically spaced parallel relationship with their travel synchronized to permit the transfer of the inverted half-cooked contents of the griddles on one conveyor to the griddles on the other conveyor, the upper conveyor traveling around a sprocket to move the griddles thereon from upwardly facing to inverted downwardly facing positions incident to transferring the half-cooked contents from the griddles on the one conveyor to the griddles on the other conveyor, and an arcuately-shaped plate positioned substantially concentric with and adjacent the said sprocket to retain the partly cooked products on the griddles of the one conveyor during their inversion travel to the point of transfer to the griddles of the other conveyor, the said plate having automatic means by which intermittent jets of compressed air are directed to the trailing peripheral areas of contact of the partly grilled products with the griddles to loosen the products and permit their uniform delivery onto the griddles of the said other conveyor.

A bakery-goods cooking apparatus embodying the foregoing concept comprises upper and lower conveyors A and B with the former of which is associated a transfer plate 5 mounting an air-pressure manifold 6 to which charges of compressed air are intermittently supplied by a tripper mechanism 7 actuated by a trigger means 8.

Except for a slight difference, hereinafter to be explained, in the form of the griddles on the conveyor B, both conveyors A and B are of a form and arrangement as set forth in my copending application Serial No. 463,680, filed October 21, 1954, now Patent No. 2,859,-713, dated November 11, 1958.

Figure 1:
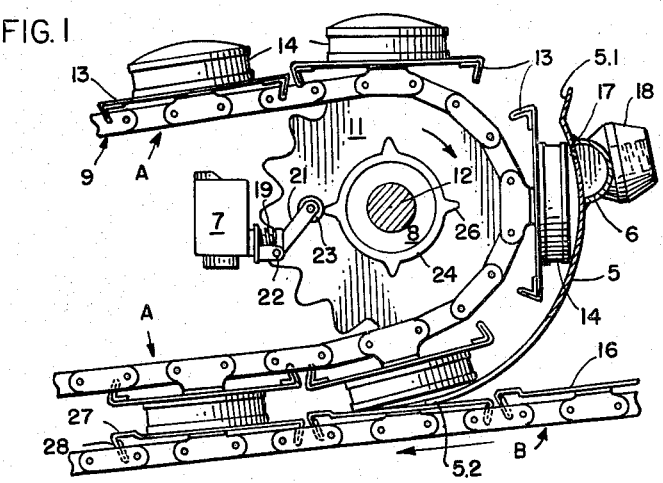
Figure 1 is a side elevation of sections of two juxtaposed griddle-carrying conveyors, one of which conveyors extends around a sprocket and adjacent which is arranged an arcuate transfer plate for loosening and retaining the partially grilled products during the inversion movement for transfer to the griddles of the other conveyor.

As is conventional with bakery equipment of this kind, the conveyors A and B each comprise a pair of laterally-spaced chains 9 which travel around pairs of spaced sprockets 11 journaled in suitable bearings on a supporting framework (neither of which are shown here). Fig. 1 shows a side view in elevation of that section of the endless chains, for conveyor A, as they travel around the sprocket 11, supported on a shaft 12, for effecting the inversion of bakery goods carried by the conveyor A in the process of their sequential cooking on opposite sides.

Forming a part of conveyor A are relatively narrow plates or flights 13 extending transversely across a pair of the chains 9 and secured, along their respective longitudinal medians, to certain of the links in the chains 9. Extending lengthwise along each member 13 is a series of product retaining pockets 14, here shown as open-top rings of uniform height suitably secured endwise in side by side relation on the outer surface of the member 13.

The conveyor B, of which here is shown only a short section of the top run, is of a construction quite the same as the conveyor A, except for the details of the grill plates or flights 16, later to be explained more in detail. The upper run of this conveyor B extends for a predetermined distance, in spaced parallel relationship to the lower run of the conveyor A adjacent the sprocket 11. The travel of these two runs of the conveyors A and B is so synchronized that the product retaining rings 14, on the lower run of conveyor A, and the grill plates 16, on the upper run of conveyor B, come into proper registration to permit the transfer of the goods from the rings 14 to the plates 16 on substantially the longitudinal center-lines thereof. As has been explained so fully in the above-identified copending application, the bottom run of the conveyor A and the top run of the conveyor B travel together in parallel relation for a predetermined distance and then separate so that the conveyor B drops away from conveyor A to completely free the product articles from the confines of the respective rings 14 on the conveyor A.

The plate or shoe 5, is provided to effect an inversion of the half-cooked products from the retainer rings 14 to the grill plates 16 with the utmost facility free from any jarring, shock, or other disturbance that would tend to deleteriously affect the products, which are only partially processed at the time of this transfer. Thus the plate 5 is a single member of substantially the same length as the individual conveyor plates or flights 13, and is curved transversely, in the direction of its width, on an arc centered substantially on the axis of the shaft 12. Preferably the shoe or plate 5 is of a width to subtend an arc of at least 90 degrees and its upper margin 5.1 is turned backwardly to permit smooth entry of the raised goods into the plate area.

This arcuate-shaped plate or shoe 5 is formed of resilient metal and suitably secured to the supporting framework of the machine (not shown) so as to dispose the plate 5 transversely of the conveyor A, concentrically of and adjacent the sprocket shaft 12, in appropriate closely-spaced relationship to the path of the outer rims of the retainer rings 14 as they make their 180° turn around the shaft 12 to their inverted position. As shown in Fig. 1 the plate 5 is positioned parallel with the axis of the shaft 12 and so that its lower edge 5.2 is located rearwardly of the vertical plane of the shaft 12. The lower margin of the plate 5 is also curved to be substantially tangential to the plane of the lower conveyor flights 16, and the plate 5 is made of a sufficiently resilient material to provide yielding contact with the upper faces of the successive grill plates 16, so that the half-processed goods initially in the retainer rings 14 are eased directly onto the moving grill plates 16, the margin of the plate 5 yielding upwardly after each transfer to permit the approach of the next successive grill plate to the product receiving position.

Preferably, the plate 5 has the concave face thereof highly polished or suitably coated, in a manner explained in the aforesaid copending application. This is done to present a minimum of friction to the half-cooked products in the retainer rings 14 so that they will slide across the plate face without appreciable drag or pull. This serves to avoid a distortion of the products, that might otherwise occur, in the course of their being transferred from the conveyor A to the conveyor B for further cooking.

Figure 2:
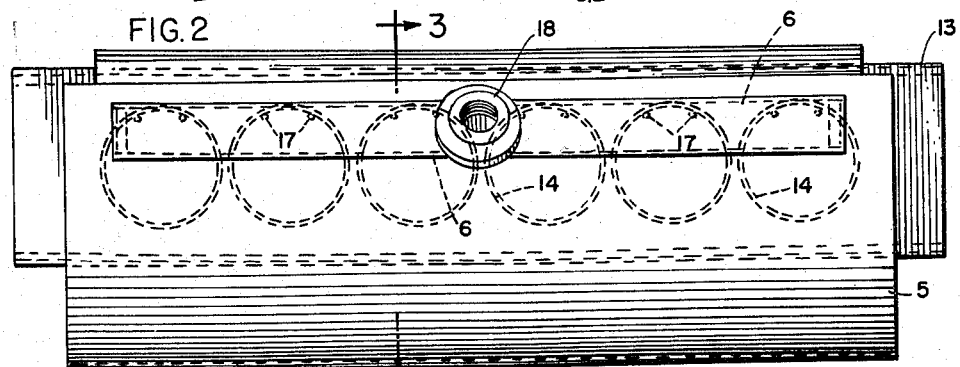
Fig. 2 is a right-end view of the transfer means shown in Fig. 1.

Adjacent and along the upper edge of the turn plate 5 is a series of pairs of plate apertures 17. Fig. 2 shows these apertures in series of pairs, one pair for each retainer ring 14, and each pair of apertures is arranged on an arc that is part of a circumference substantially identical with the inner circumference of the retainer rings 14 and centered on the center-line of travel of a respective ring. As shown the apertures of each pair are disposed on the upper side of the said arc, one on each side of the center-line of travel of the respective rings.

It will be understood that as the dough balls are grilled on the plates 13 of the conveyor A they will expand to completely fill the retainer rings 14, whereby the finished product acquires its final shape, and the product tends to become adhered to the ring and the grill plate. Therefore, the function of the apertures 17 is to cause jets of compressed air, supplied at a pressure of about 60 p.s.i., to be directed into the trailing peripheral line of contact between the side walls of the rings 14 and the goods contained therein, while the goods are engaged by the plate 5, so as to loosen the goods from the ring sidewall and the surface of the grill plates 13 and to make it certain that the goods will never fail to be released from the rings 14 at the time the goods have passed the lower edge 5.2 of the plate 5. Such timely release of the air jets is effected by the coordinated operation of the air release mechanism 7 and the trigger means 8, as presently will be explained.

Figure 3:
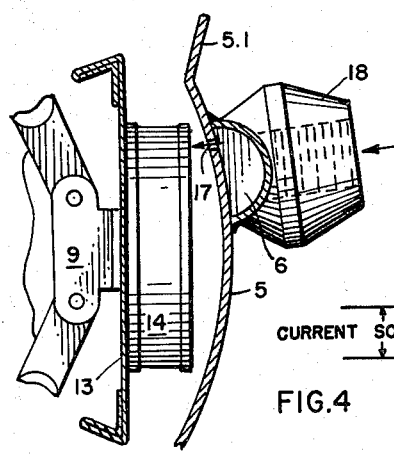
Fig. 3 is an enlarged, fragmentary sectional view taken on the plane of the line 3—3 of Fig. 2.
Figure 4:
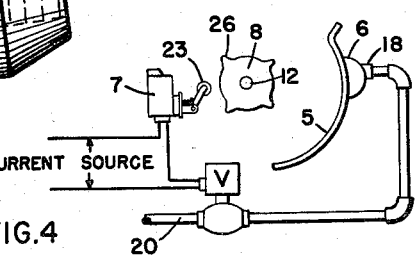
Fig. 4 is a diagrammatic view showing an arrangement of means for effecting intermittent release of air jets from the transfer means.

The air-pressure manifold 6 is shown in the form of a nearly semi-circular tube (Figs. 1 and 3), with closed ends, welded at its edges along the upper edge of the plate 5. Preferably, the manifold 6 is positioned on the plate 5 so that the series of apertures 17 are disposed closely along the upper edge of the manifold 6. Suitably bonded to the manifold 6, generally near its middle point, is a coupling 18 to which may be connected a suitable pipe leading to a source of compressed air as shown in Fig. 4.

The air release means 7, as shown, for effecting the predetermined intermittent release of compressed air through the plate apertures 17, is a conventional, normally open, micro-switch. The micro-switch is connected in an electric circuit leading to a conventional electrically-operated valve V appropriately located between a source of air-pressure 20 and the coupling 18 on the manifold 6 as shown in Fig. 4. The micro-switch is biased by a spring 19 (Fig. 1) toward the normally-open position of the switch contacts and the switch contacts are closed by the inward actuation of a rocker arm 21 pivoted at 22 to the micro-switch housing. At its outer end the rocker arm mounts a roller 23 for contact with the trigger means 8.

The trigger means 8, here is shown in the form of a cam ring 24 fixed on the shaft 12 to turn therewith. The ring 24 is formed with a plurality of radial projections or teeth 26 so arranged peripherally as to intermittently engage the roller 23 and depress the arm 21 to close the micro-switch means 7 at predetermined intervals synchronized with the movement of each of the grill plates 13 and rings 14 past the line of apertures 17 in the plate 5. Such closing of the micro-switch means 7 effects an instantaneous release of a charge of compressed air to the air manifold 6 to cause the air jets to be directed toward the rings 14 and their content as previously explained herein.

As here shown, there are four of these projections or teeth 26 on the cam ring 24, spaced 90 degrees apart around the periphery of the cam ring 24. The angular relation of these teeth is such as to effect the discharge of the air jets at the instant that each plate 13 of the conveyor A presents its row of retainer rings 14 in position, relative to the turn-over plate 5, where the upper peripheries of the rings are aligned with the respective pairs of apertures 17, as is most apparent from Fig. 2. It will be understood of course that the location of the micro-switch 7 and the cam ring 24 may be at any convenient place along the shaft 12, either within the machine or on the outside of the machine, and that the size of the cam ring 24 is immaterial since it turns with the shaft 12 at the same speed. The number of teeth on the cam ring will, of course, depend upon the diameter of the sprocket 11 and the number of flights or plates 13 that pass in one revolution of the sprocket.

The grill plates 16, on the conveyor B, differ from those on the conveyor B of the previously-identified copending application, in that upwardly-extending retaining ridges 27 (Fig. 1) are formed along the advancing edges of these plates 16. In the form shown, this is accomplished by a substantially square upset in the longitudinal margin of each plate 16, inwardly from its leading edge. The perimetrical portion outwardly of the upset ridge 27 is turned downwardly to form a flange 28 extending below the plane of the plate 16. This upset ridge 27 tends to hold the transferred products from being accidentally shifted off the forward edge of the plates 16, particularly when the conveyor B inclines downwardly to separate from the bottom run of the conveyor A and remove the rings 14 from the grilled products. Moreover, the upset ridge 27 and the downwardly-extending flange 28 increase the rigidity of the plates 16 over the type shown in the aforesaid copending application and serve to prevent the grilling surfaces from warping.

The operation of this improved baking machine product-turn-over means is substantially as follows:

As is explained in my said copending application, dough batches are successively deposited in the batteries of griddle rings 14, at the end of the machine opposite that shown in the drawings herein. The conveyor A moves these filled griddle rings 14 to the end of the machine shown in Fig. 1, where the chains 9 travel around the sprockets 11, and past the plate 5 for transferring the partially-cooked goods from the griddle rings 14 invertedly onto the griddle members 16 on the synchronically moving conveyor B. During the passage from the loading or depositing postion to the turn-over plate the dough in each ring expands laterally and upwardly, to completely fill the ring, and bulges outwardly above the ring as indicated in Fig. 1. Thus the expanded dough engages the curved adjacent surface of the plate 5 and the partly cooked goods is held in the ring between the grill plate 13 and the plate 5.

As each battery of the rings 14, on the conveyor A, approach a practically vertical position, as most clearly shown in Fig. 1, one of the radial fingers 26 on the cam 24 depresses the rocker arm 21. Thereupon the microswitch means 7 is actuated to close the circuit to a suitable electrically operated valve V to open the valve and discharge a blast of compressed air to the manifold 6 on the turn-over plate 5. This release of air pressure occurs at the instant the series of apertures 17 in the plate 5, are in registration with the upper inner circumference of the respective griddle rings 14 as shown in Fig. 2. The release of the compressed air to the manifold 6 directs jets through these apertures 17 into the trailing peripheral inside areas of contact of the griddle rings 14 and their respective products and such air jets not only force themselves between the product body and the wall of the ring and then travel circumferentially between the product and the ring, but also cause a portion of the air to travel across the surface of the grill plate 13 beneath the product, so as to fully loosen the partly-processed products from each of the rings 14 and the griddle plate 13.

Since these products are in surface contact with the plate 5, obviously, they cannot be dislodged by this force of the air jets at these areas. The products, however, are completely freed from any sticking that may occur during the first part of the grilling process and in addition all loosened and charred particles of flour or corn meal are blown off the grill plates and out of the rings 14 so as to leave them clean and clear for reloading when they again reach the loading end of the continuously operating griddle machine.

As these loosened products move on past the free end of the plate 5, bearing against the griddle members 16, they are eased onto the members 16 in their properly inverted positions ready for cooking on the lower side as they are transported through the oven by the conveyor B.

The main advantages of this invention reside in the complete and certain release of the partially cooked products, from the grilling plates and retaining rings on the first conveyor, during the turn-over operation; the complete and automatic cleansing of the grill plates and product retaining rings of the first conveyor during the turn-over procedure; and the certain release and deposit of the partially cooked articles onto the grill plates of the second conveyor; all without deleterious jarring or disturbance of the products that might cause them to lose entrapped gas or become deformed. Other advantages reside in the smooth and easy transfer of the goods from the transfer shoe to the grill plates of the second conveyor; and in the simple construction and arrangement of the improved turn-over apparatus, whereby a fully automatic precisely timed turn-over operation is accomplished.

Although but one specific embodiment of this invention is herein shown and described it will be understood that numerous details of the structure and arrangement shown may be altered or omitted without departing from the spirit of the invention as defined by the following claims.

I claim:

1. A continuous griddle comprising, a sprocket, a conveyor embracing the sprocket for moving a succession of open top product retaining means mounted thereon through substantially 180 degrees from an upwardly-facing position to an inverted downwardly-facing position, an arcuate-shaped plate arranged concentrically of and adjacent the sprocket turning path of the conveyor to contact the contents of said retaining means during the lower portion of their inversion movement, said plate having a series of apertures therethrough aligned with the paths of travel of the product retaining means, an air-pressure manifold mounted on the said plate and communicating with the said apertures, and means for intermittently delivering air under pressure to the manifold to cause jets of air to be directed through said apertures and against the trailing peripheral line of contact of the outer face of the contents with the wall of each of the retaining means to loosen the contents from the retaining means and insure subsequent gravitational release of the contents when the retaining means are in their fully-inverted positions.

2. A bakery-goods machine comprising, a sprocket, a conveyor embracing the sprocket for moving a succession of open top product retaining receptacles mounted thereon through substantially 180 degrees from upwardly-open positions to inverted downwardly-open positions, said receptacles being arranged in rows extending transversely of the conveyor line of travel, an arcuate-shaped plate mounted concentrically of and adjacent the sprocket to confine the receptacle contents during the lower portion of their inversion movement, said plate having a series of apertures arranged in a row parallel with the rows of receptacles and positioned to register with the trailing inner peripheries of the respective receptacles when said receptacles are in a predetermined position opposed to the plate, an air-pressure manifold arranged on the plate to communicate with each of the series of apertures, means for delivering air under pressure to the manifold to cause jets of air to be directed through the said apertures and against the trailing peripheral line of contact of the outer face of the contents of each receptacle with the respective receptacle wall to loosen the contents from the receptacle surfaces, means for effecting the intermittent discharge of the air jets, and means controlled by the conveyor for actuating the air jet release means at predetermined intervals.

3. A bakery-goods machine comprising, a sprocket, a conveyor mounting transverse rows of product retaining rings and embracing the sprocket for moving the rows of rings through substantially 180 degrees from upright to inverted positions, an arcuate-shaped plate extending transversely of the conveyor and mounted concentrically of and adjacent the sprocket for confining the ring contents during the lower portions of their inversion movement, a manifold extending along the back side of the said plate substantially parallel with the sprocket axis for connection to a source of air pressure, the said plate having a plurality of pairs of apertures arranged in a row transversely of the conveyor path and in communication with the manifold, each pair of apertures being disposed in the path of a respective product retaining ring and positioned to be aligned with the trailing inner peripheral edge of the respective ring at a predetermined time during the inversion movement of the rings, whereby air jets concurrently issuing from the plate apertures may be directed against the trailing peripheral line of contact between the wall of each ring and the outer face of the ring contents, and means for effecting an intermittent supply of compressed air to the air manifold at predetermined intervals during conveyor movement.

4. A bakery-goods machine comprising, a sprocket, a conveyor having a succession of transversely extending flights each mounting a transversely extending row of griddle rings, said conveyor embracing the sprocket for moving the rows of rings through substantially 180 degrees from upright to inverted positions, an arcuate-shaped plate mounted concentrically of and adjacent the sprocket for confining the griddle-ring contents during the lower portions of their inversion movement, a manifold extending along the back of the plate for connection to a source of air pressure, the plate having a plurality of pairs of apertures in communication with the manifold, each pair of apertures being disposed in the path of a respective griddle ring and positioned to be aligned with the trailing inner periphery of the respective griddle ring at a predetermined time during the inversion movement of the griddle rings, whereby air jets concurrently issuing from the plate apertures may be directed against the trailing peripheral line of contact between the wall of each griddle ring and the outer face of the ring contents, and means for effecting an intermittent supply of compressed air to the air manifold when the trailing peripheries of each row of said rings are aligned with said apertures.

5. A bakery-goods machine comprising, a sprocket, a conveyor mounting transverse rows of open top receptacles and embracing the sprocket for moving the rows of receptacles through substantially 180 degrees from upright to inverted positions, an arcuate-shaped plate mounted concentrically of and adjacent the sprocket for confining the receptacle contents during the lower portions of their inversion movement, a manifold extending along the back side of the plate for connection to a source of air pressure, the plate having a plurality of apertures in communication with the manifold, a pair of said apertures being aligned with the path of travel of a respective receptacle and positioned one on each side of the centerline of said path to be aligned with the trailing periphery of the receptacle at a predetermined point during the inversion movement of the receptacle, whereby air jets concurrently issuing from the plate apertures are directed against the trailing peripheral line of contact between the wall of each receptacle and the outer face of the contents of the receptacle, and means actuated in timed relation with the rotation of said sprocket for effecting an intermittent supply of compressed air to the plate manifold for discharge through said apertures.

6. A bakery-goods inverting means comprising, a sprocket, a continuous conveyor embracing the sprocket for moving a succession of open top product receptacles mounted thereon through substantially 180 degrees from upright positions to inverted positions, a second conveyor comprising a series of flat transversely extending grill plates positioned to travel in contiguous parallel relationship to a lower flight of the first-mentioned conveyor, and an arcuate-shaped turn-over shoe of resilient material mounted concentrically of and adjacent the sprocket and the path of the said receptacles to retain in place the contents of the receptacles during the inversion movement, the lower edge of the said shoe being positioned in flexibly yielding contact with the grill plates on the second conveyor.

7. A bakery-goods inverting means comprising, a sprocket, a conveyor embracing the sprocket for moving a succession of transversely extending rows of open top receptacles mounted thereon through substantially 180 degrees from upright positions to inverted positions, a second conveyor mounting a series of transversely extending griddles positioned to travel in contiguous parallel relationship to a lower flight of the first-mentioned conveyor, the griddles on the second conveyor being flat plates having downwardly-extending flanges along their leading and trailing edges, each of said flat plates each being upset along the leading edge thereof inwardly of the flange to form a ridge projecting above the plane of the main portion of the plate, and an arcuate-shaped turn-over shoe of resilient material mounted concentrically of and adjacent the sprocket and the path of the said receptacles to retain in place the contents of the receptacles during the inversion movement, the lower end of the said shoe being positioned in yielding contact with the surfaces of the griddle plates on the second conveyor and flexible to pass over said ridges thereon.

References Cited in the file of this patent

UNITED STATES PATENTS

| | | |
|---|---|---|
| 2,271,937 | Engels | Feb. 3, 1942 |
| 2,640,445 | Reget | June 2, 1953 |
| 2,750,875 | Finlayson | June 19, 1956 |
| 2,859,713 | Noel | Nov. 11, 1958 |